United States Patent [19]

Green

[11] Patent Number: 4,687,074

[45] Date of Patent: Aug. 18, 1987

[54] TREE HARNESS

[76] Inventor: James W. Green, 95 W. Crossville Rd., Roswell, Ga. 30075

[21] Appl. No.: 789,378

[22] Filed: Oct. 21, 1985

[51] Int. Cl.⁴ .............................................. A63B 29/02
[52] U.S. Cl. ....................................................... 182/3
[58] Field of Search ........................................ 182/3–9; 119/96

[56] References Cited

U.S. PATENT DOCUMENTS

| | | | |
|---|---|---|---|
| 296,769 | 4/1884 | Miller et al. | 182/7 |
| 2,109,188 | 2/1938 | Bajanova | 182/7 |
| 2,254,179 | 8/1941 | Hoyt | 182/7 |
| 2,680,593 | 6/1954 | McIntyre | 182/7 |
| 3,212,690 | 10/1965 | Green | 182/3 |
| 3,379,439 | 4/1968 | Sorenson | 182/3 |
| 3,484,833 | 12/1969 | Stephen | 182/7 |
| 4,103,758 | 8/1978 | Himmelrich | 182/3 |
| 4,298,091 | 11/1981 | Anderson | 182/3 |
| 4,396,091 | 8/1983 | Anderson | 182/3 |
| 4,478,311 | 10/1984 | Anderson | 182/3 |
| 4,508,045 | 4/1985 | Spanier | 182/7 |

FOREIGN PATENT DOCUMENTS 2529559  7/1975  Fed. Rep. of Germany ......... 182/3

OTHER PUBLICATIONS

Jim Dougherty Archery '85; p. 29, #1347, Anderson Tree Sling.

*Primary Examiner*—Reinaldo P. Machado
*Attorney, Agent, or Firm*—Newton, Hopkins & Ormsby

[57] ABSTRACT

A tree harness having a flexible seat for supporting a wearer's body at about the center of gravity. Leg loops for engaging the wearer's thighs are attached to the seat as a safety feature in order to prevent the wearer from falling out of the harness. The seat has an adjustable belt and is attached to a tree by a long adjustable strap. A pouch is attached to the back of the seat for providing additional storage.

7 Claims, 4 Drawing Figures

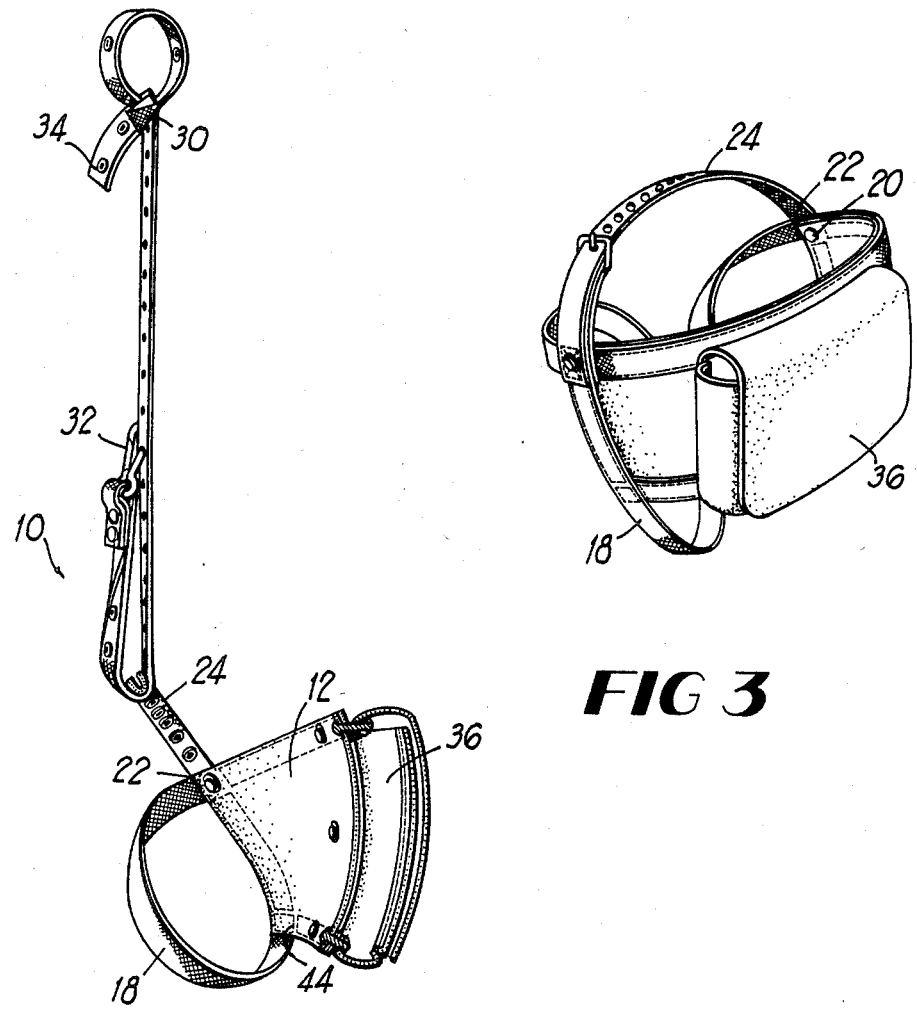
FIG 3
FIG 2
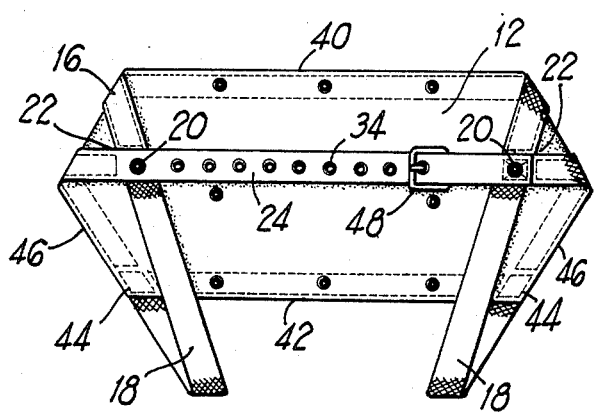
FIG 4

TREE HARNESS

The present invention relates to safety harnesses, and more particularly to a tree harness especially adaped to provide a safe and comfortable seat for deet hunters and other outdoor sportsmen while awaiting the approach of game animals.

BACKGROUND OF THE INVENTION

It is well known by outdoor sportsmen, especially deer hunters, that it is often advisable to select a given location in which to hide while awaiting for game to appear. One preferred location is high in a tree because the tree offers both camouflage and a bird's eye view of the surrounding territory. Because a hunter may wait hours for a deer to come within shooting range, tree sitting often becomes uncomfortable and can be dangerous.

Portable tree seats are well known in the art, however, those that are currently available are either complex devices that are expensive and time consuming to manufacture or simple sling-like supports that are unsafe because it is easy for a hunter to tip backwards and fall out of the seat.

Also, many of the tree seats that are in use today are too bulky and heavy to be carried conveniently for long distances.

It is, therefore, an object of the present invention to provide a tree harness that provides maximum maneuverability without compromising the hunter's safety.

It is also an object of the present invention to provide a seat that is readily adjustable for accomodating hunters of various sizes and ages.

Another object of the present invention is to provide a lightweight harness that can be worn and not carried by the hunter.

Another object of the present invention is to provide a harness that is comfortable for extended periods of time.

A further object of the present invention is to provide a harness that has easily accessible storage for carrying additional equipment.

An even further object of the present invention is to provide a harness that is simple in construction, durable, and inexpensive to manufacture.

Other objects and advantages of the pesent invention will become apparent from the following description and the accompanying drawings which are merely illustrative of the present invention.

SUMMARY OF THE INVENTION

The harness of the present invention has been designed to provide the wearer with a tree seat that is safe while also being simple in construction and relatively inexpensive to make.

The harness of the present invention comprises a flexible seat for supporting the wearer's body at about the center of gravity, the seat having a strip of reinforcing material attached around the outer edges. A pair of leg straps are attached to the seat for engaging the wearer's upper thighs and a strap means is adapted to secure the flexible seat to a tree. The leg straps are formed by extending the reinforcing material beyond the edges of the seat to form loops having a diameter sufficient to encircle the wearer's upper thighs. The flexible seat has a generally trapezoidal shape wherein the top edge is longer than the bottom edge and the two top corners are connected by an adjustable belt. The strap means is a long strap for attaching the seat to the tree. The strap may be a single strap whereby one end is wrapped around and tied to the tree and the other end wraps around the seat belt and is provided with a hook that fastens to any number of spaced apart holes located along the entire length of the strap. Alternatively, the strap may wrap around both the tree and the harness seat belt forming a double strap extending the entire distance therebetween. In order to prevent slippage, the strap may be secured to the tree with a half hitch knot. A storage pouch is attached conveniently to the backside of the flexible seat.

BRIEF DESCRIPTION OF THE DRAWINGS

FIG. 2 is a side elevational view of an alternate embodiment of the invention with the seat portion and storage pouch shown in cross-section.

FIG. 3 is a back perspective view of the flexible seat of the invention, showing the storage pouch.

FIG. 4 is a modified plan view of a substantially flattened seat portion of the invention.

DETAILED DESCRIPTION OF THE DRAWINGS

Figure 1:
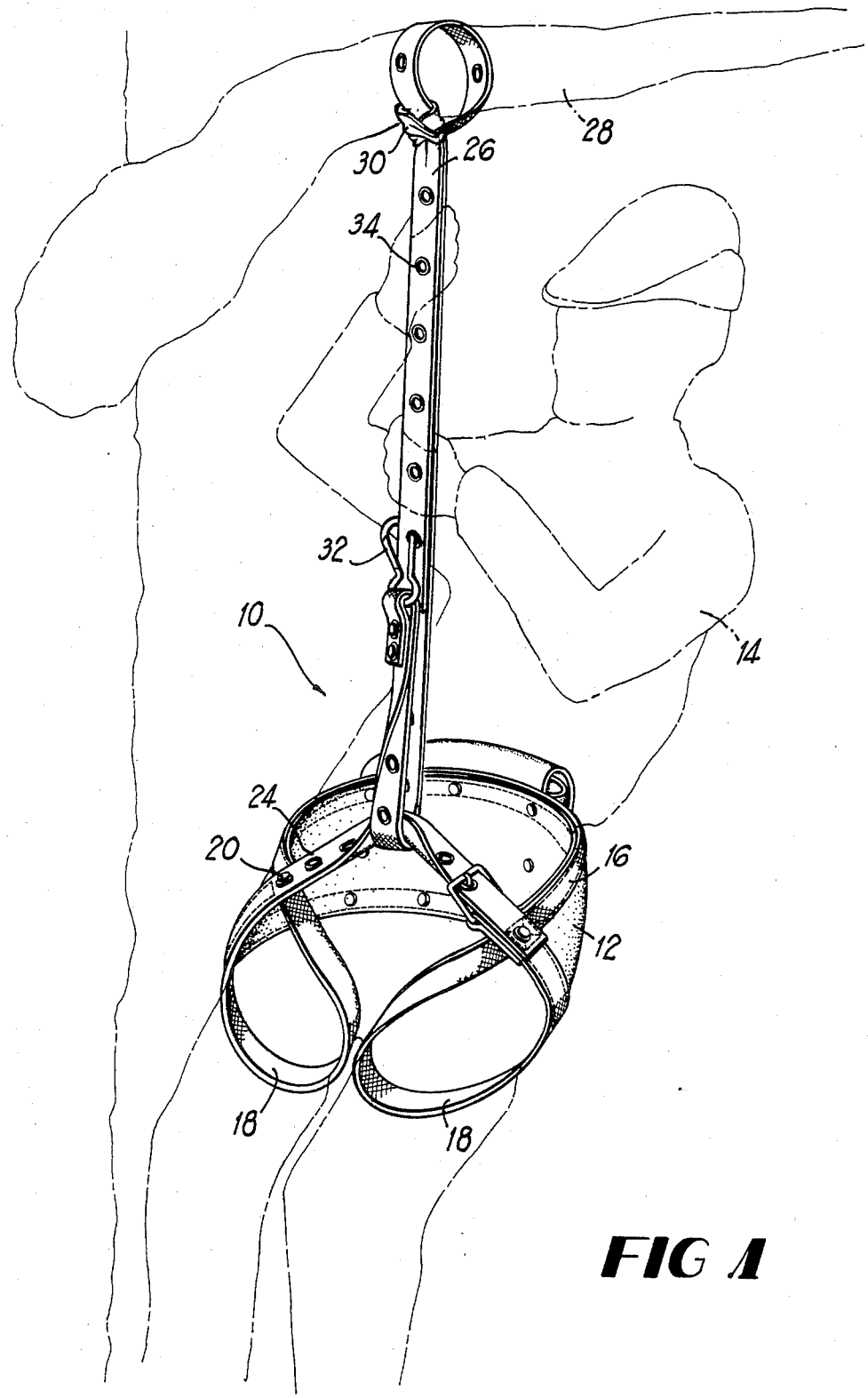
FIG. 1 is a front perspective view of the preferred embodiment of the invention showing the tree harness as it would appear when in use.

In reference to the drawings, the tree harness of the present invention is illustrated therein and indicated generally as 10. The tree harness is illustrated in FIG. 1 in its preferred embodiment, as it would appear when being used by a hunter. While the tree harness is illustrated as being attached to a three limb, it is understood that the present invention may wrap around the trunk of the tree with equal facility. Tree harness 10 comprises a flexible seat 12 generally constructed of a soft pliable leather, webbing or other suitable material that is capable of wrapping around the wearer's body 14, shown in phantom in FIG. 1. A strip of reinforcing material 16 is attached to flexible seat 12 around its outer edges and, as illustrated, extends beyond the edges of seat 12 to form leg loops 18. In order to provide maximum strength to leg loops 18 it is best to construct them from one continuous reinforcing strip of material. Strip 16 is stitched around the periphery of seat 12 and then further secured by placing rivets 20 at the two top corners 22 where the top edge strip of reinforcing material intersects that of the side edges. The reinforcing strip extends across the lap of wearer's body 14 forming adjustable belt 24. The two ends of reinforcing strip 16 are secured to seat 12 by stitches and rivet 20 located at top corner 22.

Still referring to FIG. 1, long adjustable strap 26 is shown supporting flexible seat 12 and hunter 14 from tree limb 28. If the hunter climbs a tree, he can maintain his balance by placing his feet on a lower tree limb, or he can suspend the harness from a lower limb and keep his feet on ground. Strap 26 is shown in its preferred embodiment which is that of a double layer construction whereby it wraps around the tree, extends downwardly and wraps around adjustable belt 24. Strap 26 may be secured in place by a half hitch knot 30. The two ends are secured together via hook 32 which engages any one of a series of spaced apart holes 34 that are located along the entire length of strap 26.

FIG. 2 shows an alternate construction for strap 26 whereby a single strap extends between the tree and belt 24. The one end of strap 26, as illustrated, is secured to tree limb 28 while the other end has attached thereto hook 32, this end being passed around belt 24 and attached to any one of strap holes 34 via hook 32.

Storage pouch 36, illustrated in FIGS. 2 and 3, is attached to the back side of flexible seat 12. Pouch 36 is most conveniently provided with a flap in order to afford the hunter easy access to the contents contained therein. Pouch 36 is attached to flexible seat 12 by stitching it to the reinforcing material 16 that runs along the top and bottom edges of the seat.

FIG. 4 is a substantially flattened view of flexible seat 12 illustrating its generally trapezoidal configuration. As can be seen, reinforcing strip 16 extends completely around the seat periphery. Top edge 40 is preferably longer than bottom edge 42 so that seat 12 can wrap comfortably around and across the back of the hunter. Also, FIG. 4 shows that leg loops 18 are formed by extending reinforcing strip 16 across top edge 40 outwardly beyond top corners 22 then downwardly to form loops 18 which are then secured to bottom corners 44. Reinforcing strip 16 then extends upwardly along side edges 46 to top corners 22, continuing across the hunter's waist to form belt 24 which connects top corners 22. The ends of reinforcing strip 16 overlap and are secured to seat 12 by rivet 20. Belt 24 is provided with a buckle 48 and holes 34 for adjusting to various body sizes.

Flexible seat 12 can be worn separately, as illustrated in FIGS. 3 and 4. This is especially advantageous because the choice hunting locations are often several miles from the highway and the hunter cannot afford to be burdened with transporting additional heavy gear.

From the foregoing, it can be seen that tree harness 10 is simple in construction and can be manufactured inexpensively. Yet, the harness design has incorporated additional safety features that provide maximum protection for the hunter. The leg loops 18 prevent the hunter from slipping out of the harness, even if he should fall asleep while waiting for deer to approach. The harness of the present invention has the additional advantage of providing a storage pouch for carrying such provisions as additional ammunition, food or drink. Although the structural components may be manufactured from various materials, it is desirable to minimize the weight of the harness while insuring maximum durability.

The present invention, may be embodied in other specific forms, however, it is understood that the scope of the invention is intended to be limited only by the appended claims.

What is claimed is:

1. A tree harness for suspending a wearer's body from a tree comprising:
   a flexible seat which supports the body at about the center of gravity, the seat having a top edge, bottom edge, two side edges, two top corners, and two bottom corners;
   an adjustable belt extending between the two top corners of the seat;
   a pair of leg straps attached to the seat for engaging the wearer's thighs, each strap being formed by extending a strip of flexible material from the top corner of one side edge to the bottom corner of the same side edge; and
   a detachable adjustable strap means having one end attached to the belt and the other end adapted to secure the flexible seat to the tree.

2. The invention of claim 1, wherein the flexible seat has a generally trapezoidal shape, the top edge being longer than the bottom edge.

3. The invention of claim 1, wherein the seat has a strip of material reinforcing its outer edges and the leg straps are formed by extending the reinforcing material beyond the top edge and two side edges of the seat to form loops having a diameter sufficient to encircle the wearer's upper thighs.

4. The invention of claim 3, wherein the reinforcing material extends beyond the edges in a single continuous strip to form the leg loops.

5. The invention of claim 1, wherein the strap means further comprises the adjustable strap having a series of spaced apart holes located the entire length of the strap, one end being tied to the tree and the other end wrapped around the belt and having a hook for attaching to any one of the spaced apart holes.

6. The invention of claim 1, wherein the strap means further comprises the long adjustable strap wrapped around the tree and the belt forming a double strap extending the entire distance therebetween, the strap having a series of spaced apart holes located along the entire length of the strap, and one end of the strap having a hook for securing that one end to the other end by attaching the hook to one of the spaced apart holes.

7. The invention of claim 1, wherein the harness further comprises a storage pouch attached to the flexible seat.

* * * * *